Aug. 11, 1953  L. R. NESTOR  2,648,165
SEED CARRIER
Filed June 4, 1945
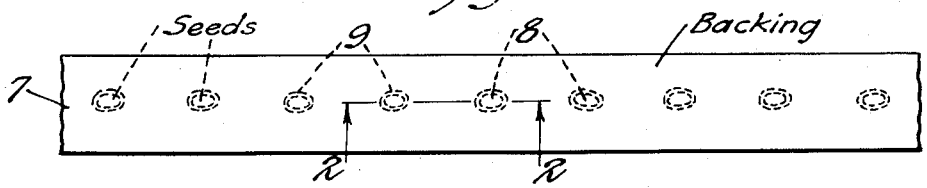
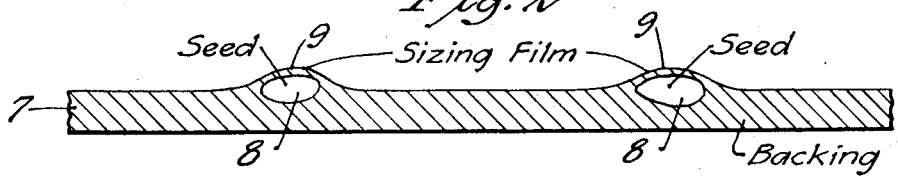
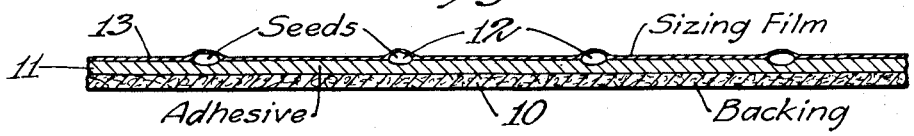
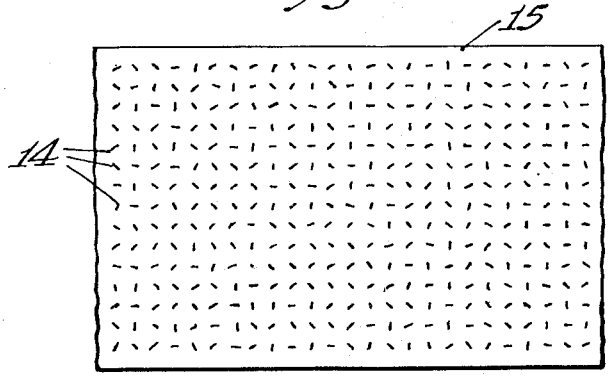
Inventor
Leonard R. Nestor
By Carpenter, Abbott, Coulter & Kinney
Attorneys Patented Aug. 11, 1953

2,648,165

UNITED STATES PATENT OFFICE 2,648,165

SEED CARRIER

Leonard R. Nestor, Minneapolis, Minn., assignor to Minnesota Mining & Manufacturing Company, St. Paul, Minn., a corporation of Delaware Application June 4, 1945, Serial No. 597,478

7 Claims. (Cl. 47—56)

This invention relates to seed carriers comprising a backing of flexible material upon which the seeds are bonded in properly spaced relation to each other and, particularly, to novel backing and adhesive materials which promote more complete and rapid germination of the seeds and good, healthy growth of the plants.

It has long been recognized that ordinary methods of sowing many kinds of loose seeds are wasteful because of the difficulties attendant upon planting them in properly spaced relation, either by hand or by the use of planting machines. These difficulties have led to the common practice of sowing an excess of seeds and then thinning out the young plants before detrimental crowding has developed. To avoid this waste of seeds and unnecessary work, it has been proposed to space the seeds on a supporting material which will disintegrate in the ground and then to cover the material carrying the seeds with earth to the required depth at the site where the plants are to grow. It appears, however, that the previously known products of this type have made little or no impression on the practical art and have been commercial failures.

From extensive tests of the several seed supporting materials and adhesives heretofore proposed as suitable for the purpose I have determined the causes of past failures and have proceeded to the discovery of new and eminently successful seed carriers. These tests show that ordinary paper, cord and cloth backing materials retard growth somewhat and are otherwise objectionable, as hereinafter pointed out, and that adhesives containing more than five percent of protein are definitely harmful both in reducing the proportion of seeds which germinate and in retarding early stages of growth. Among the proteinaceous materials found to be detrimental are animal and vegetable glues, gelatin, casein, and pastes and mucilages containing protein.

Such proteinaceous adhesives are good media for the growth of bacteria and fungi. Their presence in the soil causes putrefaction, i. e., anaerobic microbial decomposition of nitrogenous material, and/or decay, i. e., aerobic microbial decomposition. When present in contact with or in the immediate vicinity of the seeds it is possible that such adhesives may subject the seeds and/or the sprouts to putrefaction or decay or to direct attack by the protein of the adhesive, or to attack by some by-product of the decomposition of the adhesive in the soil. In either event, I have found that when the adhesive contains protein in excess of approximately five percent by weight it reduces germination and causes relatively slow germination and poor growth in the case of those seeds which germinate.

Fibrous supporting materials, such as textile fabrics, strong papers and cords are particularly detrimental to tuberous rooted plants including vegetables such as carrots, radishes, beets, rutabagas, turnips, parsnips, etc., the roots of which have a tendency to envelope and adhere to the threads or fibers remaining in the ground. Moreover, with any seed producing broad leaf sprouts the latter cannot force their way through ordinary cloth and paper backing materials which do not rot or completely disintegrate within the germination period of the seeds after being placed in the soil. Consequently the sprouts of many kinds of seeds never emerge from such backing materials and in other cases it is necessary, where such materials are used as a backing, to plant the product with the seeds on the upper surface of the backing. This involves a degree of care in planting which is difficult to obtain, particularly where narrow strips of the product are to be planted in drills. By the present invention I obviate the disadvantages of previously known backing materials and eliminate the toxic effects of proteinaceous adhesives as well as the other harmful effects of previously known seed carriers.

Where the material is to be rolled compactly for handling and shipping, as in the case of my improved product, it is important to provide tenacious adhesives for contact with the seeds which vary widely in size, shape and surface characteristics. Some kinds of seeds have smooth, somewhat oily husks which must be completely enveloped in a tenacious adhesive to prevent them from breaking loose from the carrier surface. According to the preferred form of my invention, the seeds are completely enveloped in the adhesive and securely bonded to the backing. By completely enclosing them, I minimize mechanical damage and surface injuries to them in the handling of the product and with some seeds the coating protects them from attack by bacteria and fungi both before and after planting. However, with other seeds it is not necessary to cover them completely and the sizing coat hereinafter described may be omitted.

It is an object of my invention to provide a novel seed carrier which is neither deleterious to germination nor to the normal growth of the plants to maturity.

A particular object is to secure seeds to a flexible backing having self-sustaining dry strength and relatively weak wet strength by means of an adhesive comprising a water-soluble, synthetic resin or a water-soluble, substantially protein-free carbohydrate or derivative thereof, having the required bonding strength and of such character as to promote normally rapid germination of the seeds and good growth of the plants.

A further object is to provide an improved backing comprising a non-toxic film having adequate dry strength and tenacity to constitute both a self-sustaining carrier and an adhesive for securely bonding the seeds to the backing and also having such low wet strength that it does not interfere with normal growth of the plants.

Another object is to provide a seed carrier comprising a flexible, water-soluble, non-toxic, synthetic resin, gum, starch, starch derivative, alginate or pectin, or a mixture of two or more of such materials, in which the seeds may be substantially completely enveloped without deleterious effect thereon.

A further and particular object is to provide a seed carrier comprising a water-soluble, approximately neutral, synthetic resin selected from the group comprising methyl ether of cellulose, sodium carboxy-methyl cellulose, hydroxyethyl cellulose, polyvinyl alcohol and a styrene-maleic acid copolymer.

A still further object is to provide a product of the class described with a supply of plant hormones adapted to stimulate germination of the seeds and/or growth of the plants.

With the foregoing objects in view, according to my invention, the backing or carrier for the seeds may comprise a free film of water-soluble material as follows: A continuous web of false backing or "stripper" sheet is prepared by treating a length of paper, cloth, or other suitable material with a surface coating or film of solid material, usually a resin, of such nature that the adhesive to be applied will spread evenly over the surface while wet, but can easily be removed from it when dry. A solution of a suitable adhesive is prepared having a concentration which will bring the viscosity of the solution when ready to coat to approximately 3500 centipoises. This may vary, depending upon the adhesive and the conditions of use. A uniform film of this adhesive is spread upon the false backing. The thickness of this film varies, but is usually between .020 inch and .050 inch in thickness, and is usually selected so as to produce a dried film of from .002 inch to .005 inch in thickness.

Upon the tacky film a suitable apparatus deposits seeds in spaced relation to each other, usually in rows from one-fourth to one-half inch apart, the spacing of seeds within the row being selected in accordance with the requirements of the species of seed being used. Subsequently, in order to firmly bond the seeds to the sheet and to protect them thereon, a sizing film of adhesive may be applied so that each seed is completely enveloped in adhesive. The sizing film is usually, though not necessarily, of the same kind of adhesive as the base film, and is usually less than .001 inch in thickness after drying. The product is then dried or allowed to harden, and, after drying, the seed bearing film, which is now self-supporting, is removed from the false backing.

If the seeds are to be planted in spaced rows, the sheet material is cut into long narrow strips each carrying one or more rows of seeds. Otherwise, the entire web carrying the seeds may be rolled and afterwards cut into sheets of convenient size and shape for planting in hills, beds, or otherwise as required.

The above described procedure, with only slight modification, may be employed with any of the adhesives described herein.

Typical examples of water-soluble, synthetic resin adhesive formulas are the following:

Example 1. Methyl cellulose

One (1) part by weight of methyl cellulose (methylether of cellulose, e. g. Methocel) is thoroughly mixed with nine (9) parts by weight of hot water. This mixture is placed in a refrigerator or other cooling device and is brought to 40° F., or less. Stirring occasionally aids greatly in obtaining a smooth mixture. The mixture is held at this low temperature for 10 to 30 hours, and may be frozen to improve solution. After the required time, it is ready for use and can be coated at 32° F. to 70° F.

Example 2. Hydroxy ethyl cellulose or cellosize

One (1) part of hydroxy ethyl cellulose is stirred into nine (9) parts of cold water. As soon as the material completely dissolves, the adhesive is ready for use. A film of this adhesive is usually formed at room temperature.

Example 3. Polyvinyl alcohol

A 10% solution of cold water-soluble polyvinyl alcohol is prepared by stirring the powdered adhesive into cold water, and heating to approximately 180° F. to promote solubility. This material is normally used at room temperature.

Example 4. Sodium carboxy methyl cellulose

One (1) part of sodium carboxy methyl cellulose is stirred into nine (9) parts of cold water and used at room temperature.

Pure carboxy methylcellulose or its ammonium, potassium or other suitable salts may be substituted for part or all of the sodium carboxy methylcellulose, provided corresponding changes are made in the amount of water used so as to keep the viscosity of the solution within the working range.

Example 5. A styrene-maleic acid copolymer

This resin is available as a solution containing 20% solids. By vacuum dehydration the percent of solids is raised to 28% and to the resulting solution 7½% glycerine is added so that on a solid basis the solution contains 21.1% glycerine. It is used at room temperature.

Such water-soluble, synthetic resins make excellent free films as well as good adhesives for my purposes because they are not subject to either putrefaction, decay or fermentation in the soil and they are completely dissipated by dissolution in moist soil within a period of time which is relatively short as compared with the time required for germination of substantially all kinds of seeds. It has also been shown by experiments that seeds sized with such resins show better germination than unsized seeds, probably due to the fact that coatings of these resins minimize the harmful effects of mechanical abrasion and other injuries to the seeds or hulls thereof.

The water-soluble, substantially protein-free carbohydrates and their derivatives presently to be specifically described are also not subject to putrefaction or decay. However, they are subject to fermentation and possess other properties which make them less desirable for general use as carriers or adhesives for all kinds of seeds. For use in most soils care must be taken to avoid both excessively acid and excessively alkaline conditions. It is, therefore, necessary that the adhesives for general use as seed carriers be approximately neutral and in the case of carbohydrates they must be refined to the point where they are substantially protein-free i. e., contain less than 5% by weight of protein.

Typical examples of suitable, refined, water-soluble carbohydrates for use as seed adhesives are the following:

Example 6. Starch

Solution 1.—10 parts by weight of sodium ammonium pectate, 100 parts by weight of water, 0 to 5 parts of glycerine. These ingredients may be combined by simply stirring together in a suitable vessel.

Solution 2.—20 parts of common edible cornstarch, 200 parts of water.

These are boiled until a clear solution is obtained. The adhesive is formed by mixing Solutions 1 and 2, while Solution 2 is still hot. This adhesive is usually used at a temperature of 150° to 180° F.

Example 7. Starch

Mix:
   8 parts by weight of glycerine (commercial 98% glycerine)
   20 parts by weight of common edible cornstarch
   172 parts by weight of water Boil until the solution is clear. This adhesive is used hot at 140° to 185° F.

Example 8. Modified starch

The basis of this adhesive is a cornstarch which has been modified by acid hydrolysis, and is of the type of modified starch known to the trade as a gum. The adhesive is made by boiling 20 grams of such starch in 200 grams of water until a clear solution is obtained. To this is added 10 grams of sodium ammonium pectate dissolved in 100 grams of water. The adhesive is now ready for use, and is usually coated at from 150° to 180° F.

Example 9. Pectin

A solution of fruit pectin and lactic acid can be used directly as a film forming adhesive.

Example 10. Methylated starch 324 grams of edible cornstarch were stirred into 2700 grams of cold water to give a 10.7% suspension. Sodium hydroxide was added as a 50% solution until a total of 80 grams of sodium hydroxide had been added. The solution gelled when about two-thirds of the sodium hydroxide had been added. 150 grams of methyl sulfate (excess) were added. The solution was stirred for two hours at room temperature and then was heated to 85° C. for one hour. It was then allowed to cool to room temperature. The pH was adjusted to approximately neutral by addition of sulphuric acid. The product may be used directly as a suitable adhesive, but for my purposes it is preferable to remove the salt (sodium sulfate) by a suitable means, e. g., dialysis.

Example 11. Ammonium alginate

Thirty (30) parts by weight of an ammonium alginate are stirred into 970 parts by weight of cold water. As soon as the solid has dissolved, the adhesive is ready to use.

Example 12. Sodium alginate

Thirty (30) parts by weight of a sodium alginate were stirred into 970 parts of cold water. As soon as the solid has completely dissolved, the adhesive is ready to use.

Other alginate salts may be substituted for sodium alginate.

Example 13. Acacia (gum arabic)

Five (5) parts by weight of gum acacia dissolved in 95 parts by weight of water. This is used at room temperature.

Example 14. Gum ghatti

A 3% solution is made by dissolving gum ghatti in cold water. This is usually used cold.

Example 15. Gum karaya

Three (3) parts of gum karaya is stirred into 97 parts of cold water. The adhesive is ready to use as soon as solution is complete.

Example 16

42 parts of soluble gum, of which acacia (arabic), ghatti and karaya are examples, 42 parts of water and 1 to 17 parts of glycerine are mixed, cold, then heated to 212° F. and used at room temperature.

Simple solutions of alginates and gums, such as those described in Examples 12, 13, 14 and 15, have been found to be too brittle for use as free films under dry climate conditions, but they are suitable for use with a flexible backing, such as that hereinafter described. By the addition of glycerine, as in Example 16, or other suitable flexing agent, they make self-supporting films having required flexibility.

Thin, flexible sheets or films of any of these adhesives or formed from a mixture of two or more of the materials described and with the seeds adhered thereto are adapted to be rolled or wound on spools or reels for shipping and handling. Such films have good dry strength for my purpose, combined with relatively weak wet strength as required to avoid objectionable interference with the sprouting and growth of the plants. They further guard against damage during the handling and shipping of the product and have the desired adhesive qualities securely retain the seeds.

Fibrous particles of material, such as cotton, wood or paper pulp, or other inert fibers, may be added to the film forming material to give added strength thereto, but if water-insoluble fibrous material is added, the individual fibers should be dispersed in or bonded together by a suitable water-soluble binder in order to avoid interference with the sprouting of the seeds and growth of the plants. Other inert, finely divided material, such as clay or infusorial earth, may be added to the adhesive or film forming material as extenders.

An an alternative to the use of free films comprising one or more of the adhesives hereinbefore described there may be incorporated as the backing for the seeds and adhesive a paper of such low wet strength that it will not alone support the adhesives containing water. Such thin papers may be used to reinforce the adhesive when dry and do not seriously interfere with the germination and growth of some kinds of seeds. When such paper is used the coating process consists in arranging the machine so that a "stripper" sheet, such as that used as a false backing for free films, and the sheet of thin paper backing are fed into the coating apparatus with the treated face of the stripper sheet in contact with the thin paper. The adhesive is applied to the exposed face of the thin paper backing and promptly wets through the paper causing it to adhere more or less firmly to the stripper sheet, the latter being relatively difficult to wet. The stripper sheet, having greater wet strength, carries the wet paper backing during the remainder of the coating and drying process, that is, while the seeds are distributed on the adhesive and during the subsequent sizing and drying. When dry, the seed carrier, which now includes the backing sheet, is removed from the stripper sheet and is slit into rolls or cut into sheets, as required, by known methods.

Where a preformed sheet of backing material is used, adhesive may be applied either as dots or blotches confined approximately to the areas where the seeds are to be deposited, or in the form of a continuous film on the backing. It will be further understood that the sizing coat of adhesive may be applied to completely envelop the individual seeds, either as a continuous film on the backing and seeds or confined to the seeds as by drops of adhesive applied to their several exposed surfaces.

Hormones which stimulate germination and growth may be added to the seed carrier, either as a mixture with the adhesive or as a coating directly on the seeds. The following are examples of suitable hormones for this purpose.

1. Beta-indole-3-acetic acid.
2. Levulinic acid.
3. Thiamin chloride or hydro chloride.
4. Thio-urea.
5. Alpha naphthalene propionic acid.
6. Beta-indole butyric acid.

Such hormones should be applied at a concentration of one part of the hormone to about one million parts or more of the solution. Other plant hormones suitable for my purpose are available under proprietary names.

In the accompanying drawing I have illustrated somewhat diagrammatically, by way of example and not for the purpose of limitation, some seed carriers embodying the present invention.

Referring to the drawing:

Figure 1 is a plan view showing a preferred tape or flexible strip carrying a row of seeds;

Fig. 2 is an enlarged fragmentary section through the strip taken approximately on the line 2—2 of Fig. 1;

Fig. 3 is an enlarged, fragmentary, sectional view showing a modified form of the carrier, and Fig. 4 is a plan view illustrating diagrammatically a fragmentary portion of another form of the invention.

As shown in Figs. 1 and 2, a self-sustaining, flexible strip of the character described is indicated by the numeral 7 and the seeds thereon by the numeral 8. These seeds are disposed in regularly spaced relation to each other along the center line of the strip 7, being partially imbedded therein and preferably covered with a sizing coat 9, although in some cases the sizing coat may be omitted. Where the same film-forming material is suitable for use as the backing and adhesive, the backing 7 is prepared, as hereinbefore described in detail, as a film, web or sheet and the seeds 8 are dropped on a tacky face of the backing and then a film of the same material may be applied as the sizing 9. This entire seed carrier may be formed from methyl ether of cellulose, or from either of the other synthetic resins or carbohydrates or their derivative hereinbefore described.

In Fig. 3 a form of the invention is illustrated wherein a backing 10 is first formed and then a coat of adhesive 11 is applied. This is followed by the placing of the seeds 12 while the adhesive is tacky and finally a sizing coat 13 may be applied to completely envelop the seeds and afford the desired strong bond. In this case the backing 10, adhesive 11 and sizing coat 13 may comprise similar or different materials of flexible, water-soluble and non-toxic character. For example, the backing 10 may be composed of one or more of the named adhesives or from either of them and an extender which may comprise cellulose fibers dispersed in the adhesive or the latter may be reinforced with a backing of thin paper having the required weakness when wet. The same or another of the adhesives may be used as the coat 11 and a third suitable substance may be employed as the sizing coat 13. Such fibers as may be embodied in the backing 10 as a sheet or extender are so weakly joined together that they do not interfere with the sprouting and growth of the plants. Fig. 4 illustrates an arrangement of seeds 14 suitably spaced and bonded, as hereinbefore described, to a large sheet or web 15 constituting the flexible backing.

In any case, it will be understood that the seeds are spaced on the backing in accordance with approved culture for the particular plant to be grown and the finished product is either placed on the surface of the ground or covered with earth to the proper depth. After planting in moist soil the carrier and/or adhesive dissolves within a few hours leaving the seeds in excellent condition for germination and growth.

Having described my invention, what I claim as new and desire to protect by Letters Patent is:

1. A flexible carrier for seeds comprising a permanently water-soluble, non-proteinaceous adhesive material having self-sustaining dry strength and having wet strength insufficient to be self-sustaining, and seeds supported thereby in predetermined spaced relation to each other.

2. A seed carrier according to claim 1 wherein the adhesive material is a synthetic resin.

3. A seed carrier according to claim 1 wherein the adhesive material is a synthetic cellulose derivative.

4. A seed carrier according to claim 1 wherein the adhesive material is methyl cellulose.

5. A seed carrier according to claim 1 wherein the adhesive material is a salt of carboxy methyl cellulose.

6. A seed carrier according to claim 1 wherein the adhesive material is an alginate adhesive.

7. A seed carrier according to claim 1 wherein the adhesive material is a starch adhesive.

LEONARD R. NESTOR.

References Cited in the file of this patent

UNITED STATES PATENTS

| Number | Name | Date |
| --- | --- | --- |
| 1,143,980 | McComb | June 22, 1915 |
| 2,047,398 | Voss | July 14, 1936 |
| 2,135,075 | Hermann | Nov. 1, 1938 |
| 2,216,045 | Powers | Sept. 24, 1940 |
| 2,243,857 | Fischer | June 3, 1941 |
| 2,281,927 | Fischer | May 5, 1942 |
| 2,296,584 | Stummeyer | Sept. 22, 1942 |
| 2,338,103 | Fischer | Jan. 4, 1944 |
| 2,340,072 | Medl | Jan. 25, 1944 |
| 2,362,761 | Medl | Nov. 14, 1944 |
| 2,571,491 | Schindler | Oct. 16, 1951 |

FOREIGN PATENTS

| Number | Country | Date |
| --- | --- | --- |
| 79,129 | Germany | Jan. 2, 1895 |
| 506,731 | Germany | Sept. 8, 1930 |
| 488,392 | Great Britain | July 6, 1938 |
| 492,596 | Great Britain | Sept. 19, 1938 |